United States Patent

Torii et al.

Patent Number: 5,282,390
Date of Patent: Feb. 1, 1994

[54] INDUSTRIAL ROBOT WITH MEANS FOR COOLING A LINEAR MOTION NUT AND SCREW SHAFT

[75] Inventors: Nobutoshi Torii, Hachioji; Akihiro Terada; Yasuo Sasaki, both of Yamanashi, all of Japan

[73] Assignee: Fanuc Ltd., Yamanashi, Japan

[21] Appl. No.: 867,694

[22] Filed: Jul. 7, 1992

[30] Foreign Application Priority Data

Nov. 8, 1990 [JP] Japan .................. 2-300983

[51] Int. Cl.⁵ ............................................. F16H 1/18
[52] U.S. Cl. .................. 74/424.8 R; 74/467; 74/606 A; 74/479 B
[58] Field of Search ............ 74/89.15, 424.8 R, 467, 74/606 R, 606 A, 479 B

[56] References Cited

U.S. PATENT DOCUMENTS

| | | | |
|---|---|---|---|
| 2,726,278 | 12/1955 | Southern | 74/424.8 R X |
| 3,171,295 | 3/1965 | Benckert | 74/424.8 R |
| 3,482,463 | 12/1969 | Huyots et al. | 74/424.8 R |
| 4,586,394 | 5/1986 | Perkins | 74/89.15 X |
| 4,840,077 | 6/1989 | Katahira | 74/606 A X |

FOREIGN PATENT DOCUMENTS

| | | |
|---|---|---|
| 60-25695 | 2/1985 | Japan . |
| 61-33889 | 2/1986 | Japan . |
| 63-1851 | 1/1988 | Japan . |
| 63-41495 | 3/1988 | Japan . |

*Primary Examiner*—Rodney H. Bonck
*Assistant Examiner*—David W. Laub
*Attorney, Agent, or Firm*—Nikaido, Marmelstein, Murray & Oram

[57] ABSTRACT

A cooling means for removing heat generated in a portion of a solid ball-and-screw shaft (27) provided for a screw mechanism accommodated in an industrial robot and engaged with a linear motion nut (28) accommodated in the linear motion mechanism. The cooling means permits a cooling medium, typically cooling air, to flow through a cooling medium passage (33) formed in an unthreaded end portion of the shaft (27) and having an end connected to a rotative drive motor (M), to flow through a radial hole (34) having one end connected to the cooling medium passage (33) and the other end opening into an annular space surrounding an external surface of the shaft formed with a screw thread (27a), and to flow through the annular space along the surface of the threaded portion of the shaft (27), to thereby remove heat generated at the threaded portion engaged with the linear motion nut (28).

5 Claims, 3 Drawing Sheets

INDUSTRIAL ROBOT WITH MEANS FOR COOLING A LINEAR MOTION NUT AND SCREW SHAFT

TECHNICAL FIELD

The present invention relates to an industrial robot provided with means for cooling a linear motion mechanism having a linear motion nut and screw shaft, and more particularly, to a linear motion mechanism cooling apparatus for cooling a linear motion nut and screw shaft of a linear motion mechanism also known as a ball-and-screw mechanism accommodated between a robot movable component such as a robot arm and a robot body of an industrial robot and a drive motor for driving the robot movable component for converting a rotative output of the drive motor into a linear motion to be transmitted to the robot movable component, the cooling apparatus being capable of effectively removing frictional heat generated by the rotation of the screw shaft and heat transmitted from the drive motor to the screw shaft, by flowing a cooling medium over the working surface of the screw shaft.

PRIOR ART

A cylindrical coordinate type industrial robot having a telescopically extendable and contractible arm is provided with a linear motion mechanism including a ball-and-screw nut and a screw shaft between a motor used as a rotative drive source and the robot arm for converting a rotary motion into a corresponding linear motion when driving the telescopically movable robot arm for an axial motion or in vertically shifting the robot arm. A multi-articulated industrial robot provided with a linkage-operated swing robot arm turns the swing robot arm on a joint through the operation of the linkage caused by the linear motion of a linear motion nut engaged with a screw shaft.

In the industrial robot employing a linear motion mechanism as a transmission mechanism for converting a rotation into a linear motion, the motion converting accuracy of the linear motion mechanism when converting a rotation into a linear motion by the screw action between the screw shaft connected to the drive motor, and the linear motion nut connected to a movable component, such as the robot arm, directly affects the operating accuracy of the movable component, and accordingly, the working accuracy of the industrial robot, i.e., the operating accuracy of an end effector coupled with a robot wrist attached to an extremity of the robot arm, is directly dependent on the motion converting accuracy, and thus the screw shaft must be finished with a high dimensional accuracy by precision machining. Nevertheless, no effective measure has been taken to deal with the deterioration of the accuracy of robot actions due to the deterioration of the accuracy of displacement of the linear motion nut attributable to the thermal deformation of the screw shaft during operation.

Under such circumstances, a cooling method has been proposed for suppressing the thermal deformation of a screw shaft by cooling the screw shaft. This cooling method passes cooling air through an axial bore of a hollow screw shaft to remove heat generated by screw action between the screw shaft and a screw nut engaged with the ball-and-screw shaft during robot actions, to thereby suppress the thermal deformation of the shaft.

This previously proposed cooling method, however, is applicable only to a hollow screw shaft and is not able to cool the shaft at a sufficiently high cooling efficiency, because the surface area of the bore of the shaft is not always sufficiently large and a flow of cooling air is unable to remove heat at a high efficiency. Furthermore, the cooling method is disadvantageous when applied to a hollow shaft having a small outer diameter. Still further, since a hollow shaft requires an additional machining process for boring, the hollow shaft is a relatively costly component of a robot unit.

DISCLOSURE OF THE INVENTION

Accordingly, an object of the present invention is to solve the foregoing problems encountered by the prior art.

Another object of the present invention is to provide a cooling unit capable of sufficiently and effectively removing heat from a shaft accommodated in a linear motion mechanism incorporated in an industrial robot, by flowing a cooling medium over the outer surface of the shaft, particularly over the outer surface of a portion of the shaft most frequently subjected to the screw action between the linear motion shaft and a linear motion nut engaged with the shaft.

According to the present invention, a cooling passage is formed in the rear end of a solid shaft to be connected to a rotative drive motor, an outlet opening is formed in the shaft at a position near the rear end of a threaded portion of the shaft, a cooling medium, e.g., cooling air, is flown into the cooling passage, the cooling medium is discharged through the outlet opening, and thus the cooling medium flows over the surface of the screw thread of the ball-and-screw shaft to thereby remove heat generated at the working surface of the linear motion shaft engaged with a linear motion nut.

In accordance with the present invention, there is provided a cooling unit for cooling, by a flow of a cooling medium, a rotary ball-and-screw shaft made as a solid member and provided for a linear motion mechanism for a rotation-to-linear motion conversion, arranged between a movable component and a drive motor of an industrial robot. The cooling unit comprising:

a hollow bracket unit for enclosing the shaft at a portion of one end thereof connected to the drive motor via a rotary bearing, the hollow bracket unit defining an airtight cooling medium storage chamber therein;

a cooling medium inlet unit provided on the hollow bracket unit for admitting the cooling medium supplied from a cooling medium supply source therethrough into the cooling medium storage chamber;

a cover unit for surrounding the rotary shaft at a threaded portion thereof extending from the portion accommodated in the hollow bracket unit via a substantially annular space defined as a passage for the cooling medium around the threaded portion of the shaft; and a unit for defining a cooling medium passage that allows the cooling medium to flow therethrough from the cooling medium storage chamber of the hollow bracket unit into the annular space of the cover unit.

BRIEF DESCRIPTION OF THE DRAWINGS

The above and other objects, features and advantages of the present invention will become more apparent from the following description taken in connection with the accompanying drawings, in which.

BEST MODE OF CARRYING OUT THE INVENTION

Figure 3:
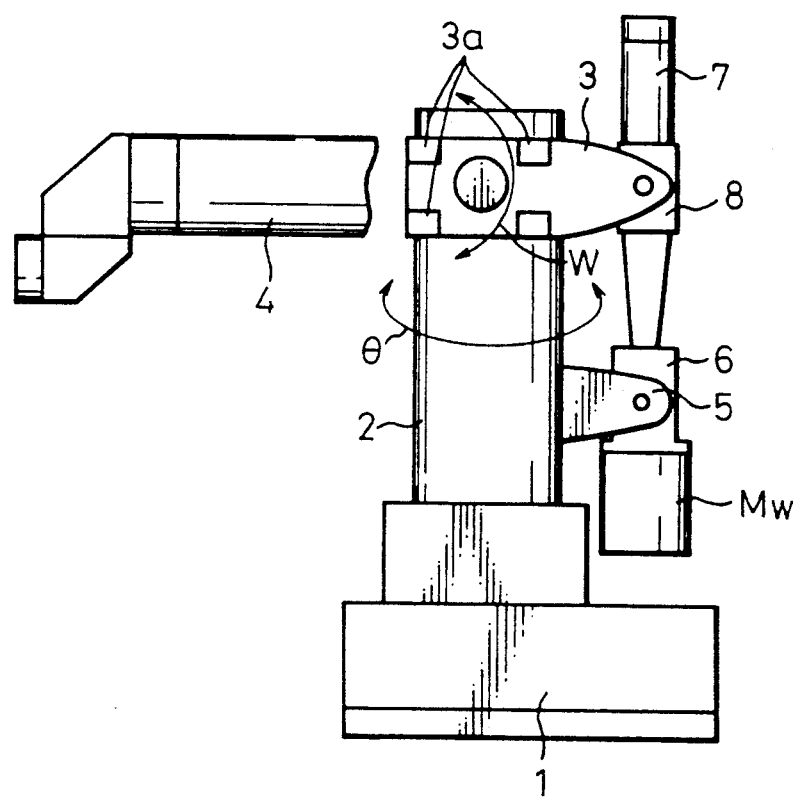
FIG. 3 is a side elevation showing the general construction of a cylindrical coordinates industrial robot to which the present invention is applied.

Referring first to FIG. 3, a cylindrical coordinates industrial robot is constructed so as to be able to employ a screw shaft cooling unit in accordance with the present invention. The industrial robot comprises a robot base 1 fixed to the floor, a rotary robot body 2 mounted on the robot base 1 for turning in the directions shown by the arrow θ, a link 3 supported on the upper end of the robot base 1 for a swing motion in the directions shown by the arrow W, a robot arm 4 attached to seats 3a formed on the link 3 and holding a robot wrist on a front end thereof, a motor holder 6 holding a drive motor Mw on a lower surface thereof and pivotally supported on a bracket 5 projecting from the side surface of the lower portion of the rotary robot body 2, a shaft 7 connected directly to, or indirectly through a reduction gear, the drive motor Mw and extending upward from the motor holder 6, and a ball-and-screw nut 8 engaging the ball-and-screw shaft 7 and pivotally joined at the rear end of the linkage 3. The linear motion shaft 7 and the ball-and-screw nut 8 are the components of a linear motion mechanism. When driven by the drive motor Mw, the linear motion mechanism turns the linkage 3 to thereby swing the robot arm 4. If the shaft 7 is properly cooled, heat generated in the shaft 7 by the screw action between the shaft 7 and the screw nut 8 is removed, and thus that the shaft 7 is maintained in a stable temperature condition. Consequently, a deterioration of the accuracy of swing motion of the robot arm 4 due to the thermal deformation of the shaft 7 can be alleviated.

The present invention provides a shaft cooling unit applicable to cooling a shaft provided in various industrial robots including such a cylindrical coordinates industrial robot.

Figure 1:
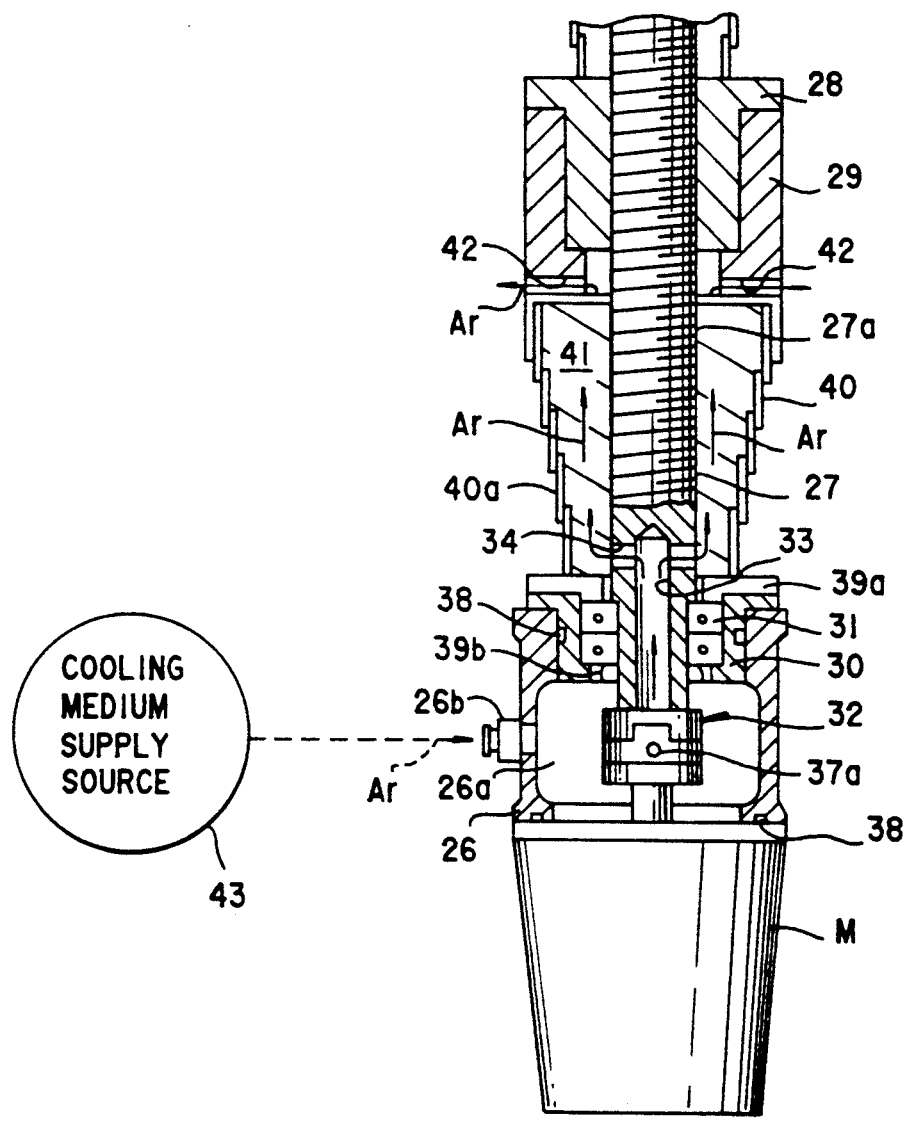
FIG. 1 is a sectional view of an essential portion of a shaft cooling unit incorporated in an industrial robot in a preferred embodiment according to the present invention, for cooling a shaft provided in the industrial robot.

FIG. 1 shows a screw shaft cooling unit in a preferred embodiment according to the present invention, designed for application to the foregoing cylindrical coordinates industrial robot.

Referring to FIG. 1, a screw shaft 27 is a solid shaft provided with a screw thread 27a in the circumference thereof but not provided with a bore. The shaft 27 has a lower unthreaded portion supported for rotation in rotary bearings 31 fitted in a bearing housing 30 held on the upper end of a hollow bracket-like motor holder 26 and coupled with the output shaft of a drive motor M by a shaft coupling 32. An axial bore 33 is formed in the unthreaded portion, and one or a pair of radial passages 34 communicating with the axial bore 33 are formed in the upper end of the unthreaded portion.

Figure 2:
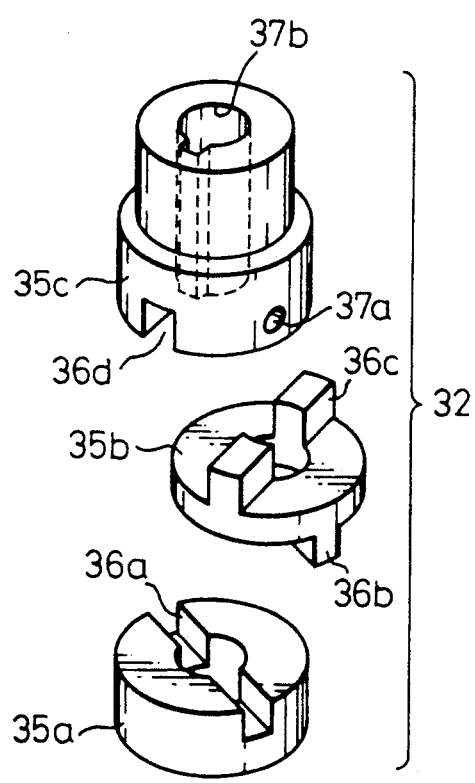
FIG. 2 is an exploded perspective view of a shaft coupling employed in the industrial robot of FIG. 1.

The shaft coupling 32 is an Oldham coupling, as shown in FIG. 2. The shaft coupling 32 has a lower coupling member 35a to be keyed to the output shaft of the drive motor M, an intermediate coupling member 35b, and an upper coupling member 35c to be keyed to the lower end of the screw shaft 27. Ridges 36b and 36c of the intermediate coupling member 35b are received respectively in a groove 36a formed in the lower coupling member 35a and a groove 36d formed in the upper coupling member 35c, to thus transmit a rotation of the output shaft of the drive motor M to the shaft 27. The upper coupling member 35c is provided with an axial bore 37b for receiving the lower end of the shaft 27, and a lateral hole 37a connected to the axial bore 37b. The shaft coupling 32 couples the output shaft of the drive motor M and the shaft 27 in a cooling medium storage chamber 26a formed in a motor holder 26. Compressed cooling air supplied from a cooling medium supply source 43, i.e., a compressed air supply source, through a pipe joint 26b into the cooling medium storage chamber 26a, flows through the lateral hole 37a and the axial bore 37b of the upper coupling member 35c of the shaft coupling 32 into the axial bore 33 of the shaft 27 from the lower end thereof, and then the cooling air flows through the axial bore 33 and through the radial passages 42 outside the shaft 27.

The threaded portion of the shaft 27 is engaged with a linear motion nut 28 held by a nut holder 29. When the shaft 27 is driven for rotation by the drive motor M, the linear motion nut 28 moves vertically along the axis of the shaft 27 together with the nut holder 29, to thus swing a movable component, such as a robot arm, connected to the linear motion 28. The threaded portion of the ball-and-screw shaft 27 is surrounded by a screw cover 40 constructed by successively fitting a plurality of circular tubes 40a one within the other. The uppermost circular tube 40a is fixed to the lower end of the nut holder 29, and the lowermost circular tube 40a is fixed directly, or indirectly, to the motor holder 26, whereby a substantially annular space 41 is formed between the threaded portion of the ball-and-screw shaft 27 and the screw cover 40. The annular space 41 is communicated with the atmosphere through radial holes 42 formed in the lower end of the nut holder 29.

Accordingly, the cooling air discharged through the radial holes 34 of the shaft 27 into the annular space 41 flows through the annular space 41 as air currents indicated by the arrows Ar in FIG. 1, removes heat from the threaded portion of the shaft 27 to cool the same, and then flows outside through the radial holes 42 of the nut holder 29. The motor holder 26 is provided with an O ring 38, i.e., a sealing member, in a portion to be sealed. In FIG. 1, indicated at 39a is a bearing holder for holding the bearings 31 in place and at 39b is a bearing nut for fastening the bearings 31 to the journal of the shaft 27.

As apparent from the foregoing description of the actions and the construction according to the present invention, a cooling medium circulating circuit is formed by connecting the axial bore 33 of the shaft 27, and the radial holes 42 through the lateral hole 37a and axial bore 37b of the shaft coupling 32 to the cooling medium storage chamber 26a of the motor holder 26 to which a cooling medium, such as cooling air, or if necessary, an inert gas, is supplied, and the cooling medium discharged through the radial holes 42 comes into direct contact with the threaded portion 27a of the shaft 27, i.e., a portion of the shaft 27 directly engaged with linear motion nut 28 for screw action, to remove heat from the threaded portion 27a and thus cool same. Since the cooling medium absorbs heat from the circumference of the threaded portion 27a having a relatively large surface area, the heat removing effect of the cooling medium is much enhanced, and thus a thermal deformation of the shaft 27 can be effectively suppressed.

As will be understood from the foregoing description of the preferred embodiment of the present invention, in the industrial robot, the present invention flows cooling air, i.e., a cooling medium, through one end of the solid shaft connected to the drive motor into the cooling medium passage formed in the shaft and opening near the rear end of the threaded portion of the shaft, and flows the cooling air discharged through the open end of the cooling medium passage over the surface of the threaded portion of the shaft to thereby remove heat from the threaded portion of the shaft engaged with the ball-and-screw nut. Since the cooling air comes into direct contact with the surface of the threaded portion having a relatively large surface area, the cooling effect of the cooling air is greatly enhanced. Particularly, since the threaded portion of the shaft engaged with ball-and-screw nut, and the portion of the same connected to the drive motor, which affect the operating accuracy of the ball-and-screw mechanism, are cooled directly and concentratedly, the accuracy of the linear motion mechanism can be effectively maintained.

Furthermore, since the shaft is a solid shaft and the cooling medium passage is formed only in a portion of the shaft, the cooling mechanism of the present invention can be applied to a shaft having a relatively small outside diameter.

Still further, the solid shaft can be manufactured at a relatively low machining cost.

LIST OF REFERENCE CHARACTERS

1: Robot base
2: Rotary robot body
3: Link
3a: Seat
4: Robot arm
5: Bracket
6: Motor holder
7: Ball-and-screw shaft
8: Ball-and-screw nut
Mw: Driving motor
26: Motor holder
26a: Cooling medium accumulating chamber
27: Ball-and-screw shaft
28: Ball-and-screw nut
30: Bearing housing
31: Rotary bearing
32: Shaft coupling
33: Axial bore
34: Radial hole
35a: Lower coupling member
35b: Intermediate coupling member
35c: Upper coupling member
36a: Groove
36b: Ridge
36c: Ridge
36d: Groove
37a: Lateral hole
37b: Axial bore
38: O ring
39a: Bearing holder
39b: Bearing nut
40: Screw cover
40a: Circular tube
41: Annular space
42: Radial hole
43: Cooling medium source
M: Drive motor
Ar: Flow of cooling air

We claim:

1. A cooling means for cooling, by a flow of a cooling medium, a rotary shaft made as a solid member and provided for a linear motion mechanism for a rotation-to-linear motion conversion, arranged between a movable component and a drive motor of an industrial robot, comprising:

a hollow bracket means for enclosing said shaft at a portion of one end thereof connected to said drive motor via a rotary bearing, said hollow bracket means defining an airtight cooling medium storage chamber therein;

a cooling medium inlet means provided on said hollow bracket means for admitting the cooling medium supplied from a cooling medium supply source therethrough into said cooling medium storage chamber;

a cover means for surrounding said rotary shaft at a threaded portion thereof extending from said portion accommodated in said hollow bracket means via a substantially annular space defined as a passage for said cooling medium around said threaded portion of said shaft; and means for defining a cooling medium passage allowing said cooling medium to flow therethrough from said cooling medium storage chamber of said hollow bracket means into said annular space of said cover means.

2. A cooling means for cooling a rotary screw shaft provided for a linear motion mechanism accommodated in an industrial robot according to claim 1, wherein said cooling medium passage comprises a predetermined length of first cooling medium passage axially formed in said portion of one end of said screw shaft connected to said drive motor, at least one cooling medium discharge passage radially formed in said screw shaft to have one end opening in an innermost end of said first cooling medium passage and the other end opening in said annular space to thereby provide a fluid communication between said first cooling medium passage and said annular space, and a second cooling medium passage formed in a shaft coupling means for coupling an end of said portion of said screw shaft and an output shaft of said drive motor to thereby transmit a rotation of said output shaft of said drive motor to said screw shaft, said second cooling medium passage providing a fluid communication between said cooling medium storage chamber and said first cooling medium passage.

3. A cooling means for cooling a rotary screw shaft provided for a linear motion mechanism accommodated in an industrial robot according to claim 2, wherein said cover means defining said annular space comprises a plurality of axially telescopically connected cylindrical tubular members, one extreme end cylindrical tubular member of said cylindrical tubular members being connected to said hollow bracket means, and the other extreme end cylindrical tubular member being connected to a linear motion nut of said ball-and-screw mechanism engaging the screw shaft whereby said cooling medium passage is communicated with an atmosphere via a third cooling medium passage formed in said linear motion nut.

4. A cooling means for cooling a rotary screw shaft provided for a linear motion mechanism accommodated in an industrial robot according to claim 2, wherein said shaft coupling means comprises an Oldham coupling.

5. A cooling means for cooling a rotary screw shaft provided for a linear motion mechanism accommodated in an industrial robot according to claim 1, wherein said cooling medium is compressed air.

* * * * *